US011310085B2

(12) United States Patent
Seller et al.

(10) Patent No.: US 11,310,085 B2
(45) Date of Patent: Apr. 19, 2022

(54) LORA ADVANCED RECEIVER

(71) Applicant: Semtech Corporation, Camarillo, CA (US)

(72) Inventors: Olivier Bernard André Seller, Sainte-Soulle (FR); Christophe Jean Jacques Devaucelle, Boudevilliers (CH)

(73) Assignee: Semtech Corporation, Camarillo, CA (US)

( * ) Notice: Subject to any disclaimer, the term of this patent is extended or adjusted under 35 U.S.C. 154(b) by 0 days.

(21) Appl. No.: 17/114,568

(22) Filed: Dec. 8, 2020

(65) Prior Publication Data

US 2021/0184901 A1    Jun. 17, 2021

Related U.S. Application Data

(60) Provisional application No. 62/946,549, filed on Dec. 11, 2019.

(51) Int. Cl.
*H04L 27/10* (2006.01)
*H04L 27/26* (2006.01)

(52) U.S. Cl.
CPC .......... *H04L 27/103* (2013.01); *H04L 27/265* (2013.01); *H04L 27/2613* (2013.01); *H04L 27/2662* (2013.01)

(58) Field of Classification Search
CPC . H04L 27/103; H04L 27/2613; H04L 27/265; H04L 27/2662
USPC ......................................................... 375/260
See application file for complete search history.

(56) References Cited

U.S. PATENT DOCUMENTS

| | | | |
|---|---|---|---|
| 5,909,148 A | * | 6/1999 | Tanaka .................. H03L 7/1075 331/2 |
| 6,549,562 B1 | | 4/2003 | Olaker et al. |
| 6,614,853 B1 | | 9/2003 | Koslar |
| 6,940,893 B1 | | 9/2005 | Pinkney et al. |
| 8,406,275 B2 | | 3/2013 | Sforza |
| 2009/0124218 A1 | * | 5/2009 | McCallister .............. H03F 3/24 455/114.2 |
| 2018/0006680 A1 | * | 1/2018 | Seller .................. H04L 27/2657 |

(Continued)

FOREIGN PATENT DOCUMENTS

| | | |
|---|---|---|
| EP | 0952713 A2 | 10/1999 |
| EP | 2449690 A1 | 5/2012 |
| EP | 2763321 A1 | 8/2014 |

(Continued)

OTHER PUBLICATIONS

European Search Report for EP20213000, dated May 12, 2021, 9 pgs.

(Continued)

*Primary Examiner* — Kevin M Burd
(74) *Attorney, Agent, or Firm* — Blank Rome LLP

(57) ABSTRACT

A LoRa receiver for processing digital chirp spread-spectrum modulated signals with an advanced module for the determination of the timing error and/or of the frequency error arranged to estimate a position of a frequency discontinuity in each symbol, extract one or more frequency-continuous fragments out of each symbol, dechirp the coherent fragments, determine a timing error, and/or a frequency error, and/or a modulation value, and/or a SNR.

9 Claims, 6 Drawing Sheets

(56) References Cited

U.S. PATENT DOCUMENTS

2018/0284215 A1* 10/2018 Peng .................... G01S 5/0268

FOREIGN PATENT DOCUMENTS

| EP | 2767847 A1 | 8/2014 |
| EP | 3264622 A1 | 1/2018 |
| WO | WO-2019/1855552 A1 | 10/2019 |

OTHER PUBLICATIONS

C. Bernier, et al., "Low Complexity LoRa Frame Synchronization for Ultra-Low Power Software-Defined Radios", IEEE Transactions on Communications, vol. 68, No. 5, May 2020, 14 pgs.

W. Baohua, "Research and Implementation of a Near-Range LFMCW Radar Ranging System", China Outstanding Doctor and Master's Thesis Database, Information Technology Series (Translation included), 2013, 6 pgs.

* cited by examiner

US 11,310,085 B2

LORA ADVANCED RECEIVER

RELATED APPLICATION

This application claims the benefit of U.S. Provisional Application No. 62/946,549, filed Dec. 11, 2019. The entire content of this application is hereby incorporated by reference.

FIELD OF THE INVENTION

The present invention relates, in embodiments, with the fields of digital radio receivers and in particular with radio receivers for digitally synthesized chirp spread-spectrum signals.

DESCRIPTION OF RELATED ART

European patent application EP2449690 describes a communication system using digitally-synthesized chirp symbols as modulation, and a suitable FFT based receiver.

Chirp generation in various kinds of radiofrequency circuits is known, for example U.S. Pat. No. 6,549,562 describes a method for generating modulated chirp signal, while EP0952713 shows a synchronization process based on chirp signals.

U.S. Pat. Nos. 6,940,893 and 6,614,853, among others, describe generation and use of chirp signal by passing an impulsive signal through a dispersive filter, and communication schemes based thereupon.

Other references known in the art describe a communication system using digitally-synthesized chirp symbols as modulation as well as a suitable FFT based receiver. European patent application EP2763321 describes, among others, one such modulation method in which the phase of the signal is essentially contiguous, and the chirps are embedded in data frames in such a way as to allow synchronization between the transmitter and receiver nodes, as well as determining the propagation range between them. This modulation scheme is used in the long-range LoRa™ RF technology of Semtech Corporation, and will be referred simply as 'LoRa' in the following of this document.

EP2767847 concerns a variant of the LoRa protocol that allows estimating the range between end points of a wireless link.

EP3264622 discloses a low-complexity LoRa receiver suitable for Internet-of-thing applications.

BRIEF SUMMARY OF THE INVENTION

According to the invention, these aims are achieved by means of the object of the appended claims.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
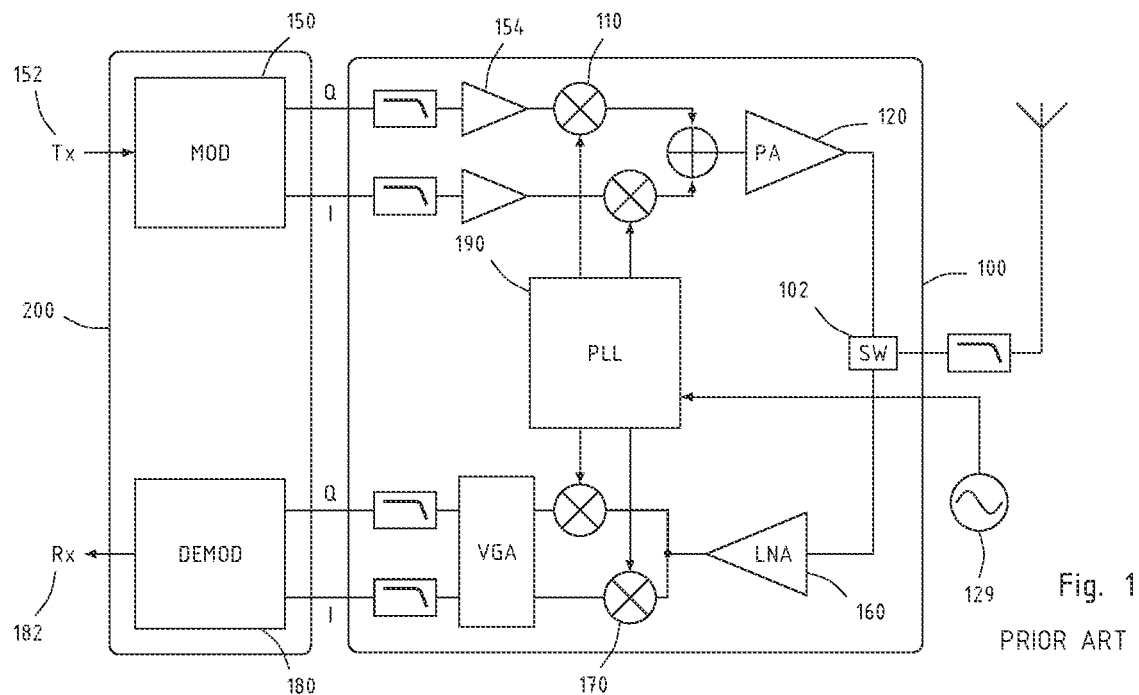
FIG. 1 shows, in schematic simplified fashion, the structure of a radio modem according to one aspect of the present invention.

Several aspects of the chirp modulation technique employed in the present invention are described in European Patent EP3264622, which is hereby incorporated by reference, and will be reminded here summarily. The radio transceiver that is schematically represented in FIG. 1 is a possible embodiment of the invention. The transceiver includes a baseband section 200 and a radiofrequency section 100. Since the present invention mostly relates to the receiver, the transmitter part will only be mentioned in passing; it includes a baseband modulator 150 that generates a baseband complex signal based on the digital data 152 at its input. This is then converted to the desired transmission frequency by the RF section 100, amplified by the power amplifier 120, and transmitted by the antenna.

Once the signal is received on the other end of the radio link, it is processed by the receiving part of the transceiver of FIG. 1 that comprises a low noise amplifier 160 followed to a down-conversion stage 170 that generates a baseband signal (which is again a complex signal represented, for example by two components I, Q) comprising a series of chirps, then treated by the baseband processor 180, whose function is the reverse of that of the modulator 150, and provides a reconstructed digital signal 182.

As discussed in EP3264622, the signal to be processed comprises a series of chirps whose frequency changes, along a predetermined time interval, from an initial instantaneous value $f_0$ to a final instantaneous frequency $f_1$. It will be assumed, to simplify the description, that all the chirps have the same duration T, although this is not an absolute requirement for the invention.

Figure 2A:
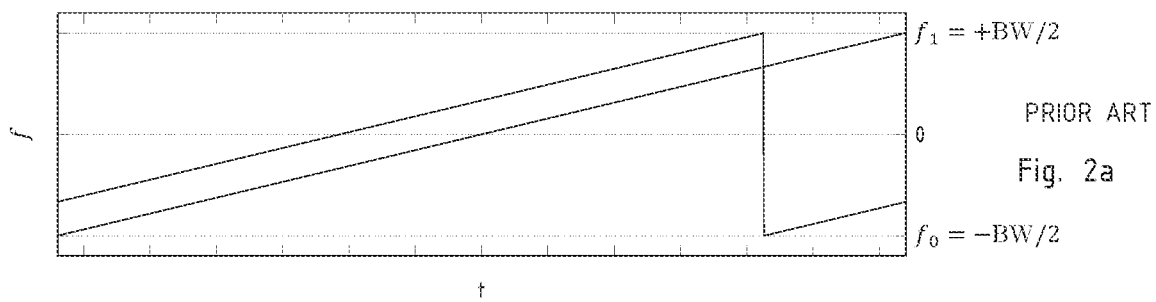
FIG. 2a plots the instantaneous frequency of a base chirp and of a modulated chirp according to one aspect of the invention. The phase of the same signals is represented in FIG. 2b, and FIG. 2c plots the real and of the complex component of the base chirp, in the time domain.
Figure 2B:
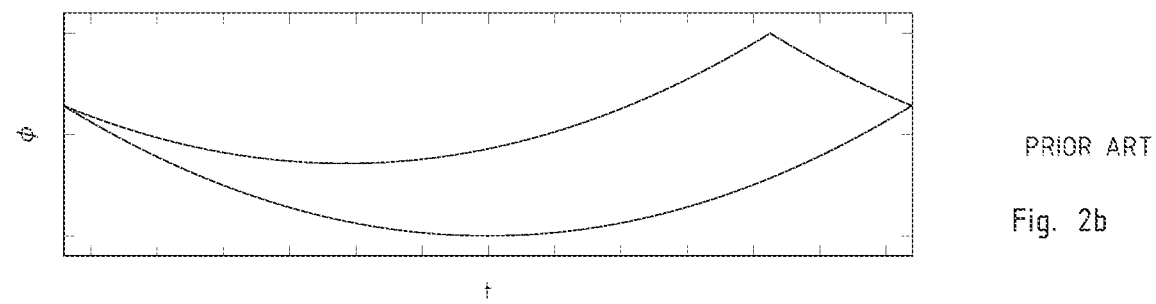

The chirps in the baseband signal can be described by the time profile $f(t)$ of their instantaneous frequency or also by the function $\phi(t)$ defining the phase of the signal as a function of the time, as plotted in FIGS. 2a-2b. Importantly, the processor 180 is arranged to process and recognize chirps having a plurality of different profiles, each corresponding to a symbol in a predetermined modulation alphabet.

Figure 2C:
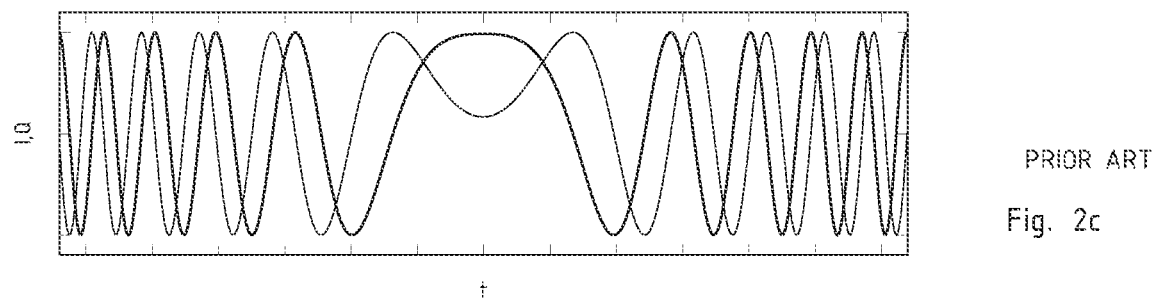

FIG. 2c is a plot of the real and imaginary component, I and Q, of the baseband signal corresponding to a base chirp, in the time domain.

The signal may include also conjugate chirps that is, chirps that are complex conjugate of the base unmodulated chirp. One can regard these as down-chirps, in which the frequency falls from a value of $f_1=BW/2$ to $f_0=-BW/2$.

According to an important feature of the invention, the received signal Rx can comprise base chirp (also called unmodulated chirps in the following) that have specific and predefined frequency profile, or one out of a set of possible modulated chirps, obtained from base chirps by time-shifting cyclically the base frequency profile. FIG. 2a illustrates, by way of example, possible frequency and phase profiles of a base chirp and of one modulated chirp between the time instant $t=t_0$ at the beginning of a chirp and the instant $t=t_1$ at the end of the chirp, while FIG. 2b shows the corresponding baseband signals in the domain of time. The horizontal scale corresponds for example to a symbol and, while the plots are drawn as continuous, they in fact represent a finite number of discrete samples, in a concrete implementation. As to the vertical scales, they are normalized to the intended bandwidth or to the corresponding phase span. The phase is represented in FIG. 2b as if it were a bounded variable, in order to better show its continuity, but it may in fact span across several revolutions in a concrete implementation.

We denote with N the length of the symbol, or equivalently the spreading factor. To allow easy reception using FFT, N is preferably chosen to be a power of two. The Nyquist sampling frequency if 1/BW, and the length of a symbol is N/BW. To fix the ideas, but without limiting the invention to these specific numeric values, one can imagine that, in a possible application, BW be 1 MHz, and N equal 1024, 512, or 256. The carrier frequency may be in the 2.45 GHz ISM band. In this embodiment, the modulation schema of the invention could occupy the same RF band as a Bluetooth® transceiver and, possibly, reuse or share the RF parts of a Bluetooth® transceiver. The invention is not limited to this frequency band, however.

Hence, a modulated symbol is a cyclic shift of the base symbol, of any number between 0 and N−1. A modulation value of 0 is equivalent to the absence of modulation. Since N is a power of two, each modulated chirp can therefore be regarded as a symbol that encodes $\log_2 N$ bits in its cyclic shift can code. It is sometimes advantageous to limit the symbol constellation to a reduced set that does not use all the theoretically possible cyclic shifts.

Thus, "cyclic shift value" may be used in the following to indicate the modulation in the time domain, and "modulation position", or "peak position" represents it in the frequency domain.

In the example depicted, the frequency of a base chirps increases linearly from an initial value $f_0=-BW/2$ to a final value $f_1=BW/2$, where BW stands for bandwidth spreading, but descending chirps or other chip profiles are also possible. Thus, the information is encoded in the form of chirps that have one out of a plurality of possible cyclic shifts with respect to a predetermined base chirp, each cyclic shift corresponding to a possible modulation symbol or, otherwise said, the processor 180 needs to process a signal that comprises a plurality of frequency chirps that are cyclically time-shifted replicas of a base chirp profile, and extract a message that is encoded in the succession of said time-shifts.

Figure 3:
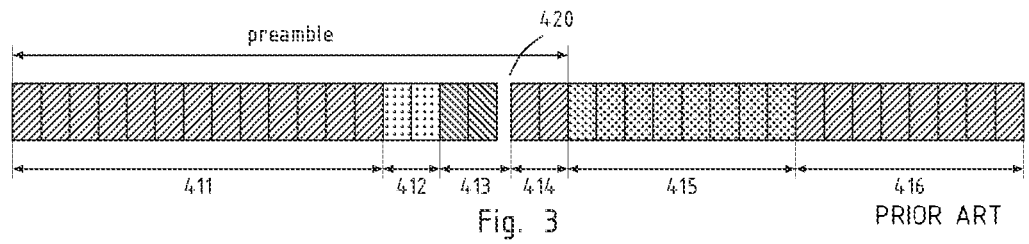
FIG. 3 represents schematically the structure of data frames exchanged between two devices in the frame of the present invention.

Preferably, the signal transmitted and received by the invention are organised in frames that include a preamble and a data section, suitably encoded. The preamble and the data section comprise a series of chirps modulated and/or unmodulated, that allows the receiver to time-align its time reference with that of the transmitter, retrieve an element of information, perform an action, or execute a command. In the frame of the invention, several structures are possible for the data frame, depending inter others, on the channel condition, transmitted data or command. FIG. 3 represents schematically, a frame structures that can be employed in various aspects of the present invention.

In the presented example, the frames have a preamble including a detect sequence 411 of base (i.e. un-modulated, or with cyclic shift equal to zero) symbols. The detect sequence 411 is used in the receiver to detect the beginning of the signal and, preferably, perform a first synchronisation of its time reference with the time reference in the transmitter. The groups of symbols 412, 413, and 414 are required by the LoRa protocol and are used for synchronization but are not necessarily part of the present invention. The preamble may be followed by a message header 415 that informs the receiver on the format of the following data, and a payload 416 that is defined by the application. By demodulating the detect sequence, the receiver can determine a shift amount and adapt the frequency and phase of its clock with those of the sender, thus allowing the decoding of the following data.

Demodulation

Preferably, the phase of the chirps is described by a continuous function $\phi(t)$, that has the same value at the beginning and at the end of a chirp: $\phi(t_0)=\phi(t_1)$. Thanks to this, the phase of the signal is continuous across symbol boundaries, a feature that will be referred to in the following as inter-symbol phase continuity. In the example shown in FIG. 2a, the function $f(t)$ is symmetrical, and the signal has inter-symbol phase continuity. As is explained in more detail by EP2449690, the structure of the signal described above allows the processor 180 in the receiver to align its time references with that of the transmitter, and the determination of the amount of cyclical shift imparted to each chirp.

The operation of evaluating a time shift of a received chirp with respect to a local time reference may be referred to in the following as "dechirping", and can be carried out advantageously by a de-spreading step that involves multiplying the received chirp by a complex conjugate of a locally-generated base chirp, and a demodulation step that consists in performing a FFT of the de-spread signal. Other manners of dechirping are however possible.

We denote with $S_j^k$ the complex values of the baseband signal in the time domain, where k is a frame index, and j indicates the sample. The combined de-spreading and demodulation operations produce the complex signal $X(n, k) = \mathcal{F}(S_j^k \cdot \overline{b}_j)$, where $\overline{b}_j$ denotes the conjugate base chirp, and $\mathcal{F}$ is the Fourier transform. The position of the maximum of the FFT is indicative of the shift, and of the modulation value. A simple "hard" demodulator for LoRa signals can be realized by computing the function $h(k)=\arg\max_n(|X(k,n)|)$.

Figure 4:
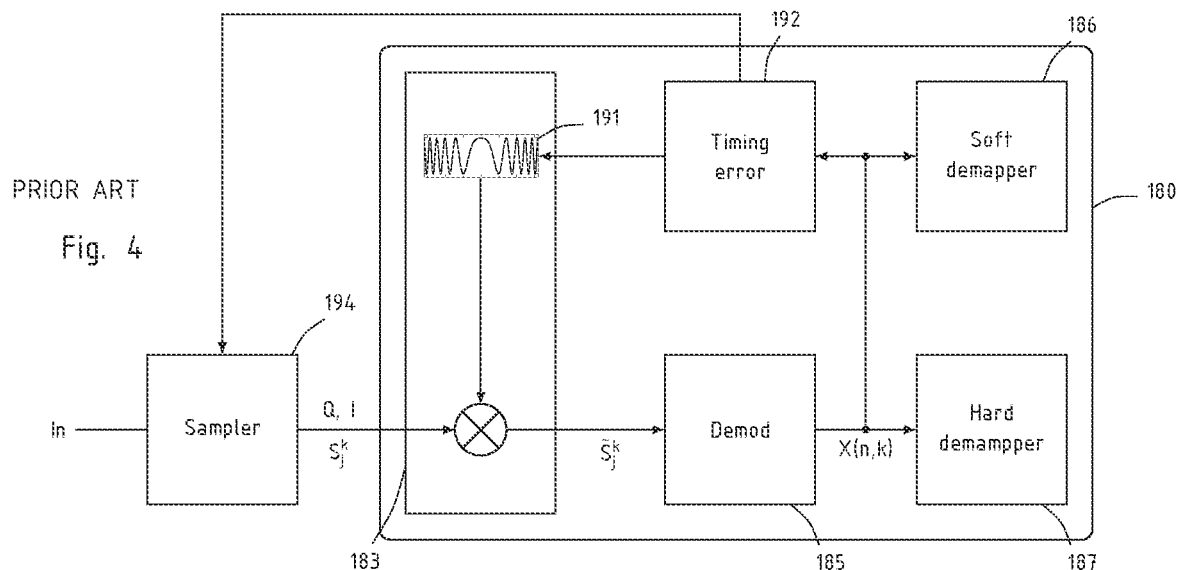
FIG. 4 illustrates schematically a possible structure, according to the invention, of a baseband processor 180 for the received signal.

These operations of de-spreading and demodulating are implemented in a de-spreading unit 183, respectively a demodulating unit 185 in the baseband processor 180 as represented in FIG. 4. The baseband processor is preceded by a sampling unit 194 that generates the series of samples $S_j^k$ in any suitable way. It must be understood, however that these wordings can be interpreted functionally and do not necessarily imply physically distinct and independent hardware elements. The invention comprising also variants in which the de-spreading unit and/or the demodulating unit are realized partly or in full in software or utilize resources in common with other element of the system.

In the presence of both time and frequency synchronisation errors, even small, the initial phase of the received symbol is different from its final phase, and there will also be a phase discontinuity at the point where the instant chirp frequency wraps around. When the symbol is un-modulated, these two discontinuities occur at the same place. When two phases discontinuities are present in a received symbol, the Fourier transform operates on two sets of data with the same instant frequency, but that may be in phase opposition, or cancel in part.

If a single discontinuity is present, for instance when there is only a frequency error, the Fourier transform will still operate on coherent data, because of its cyclic nature. A phase discontinuity in the middle of a vector of constant frequency has the same effect of a discontinuity between the end and the start of the vector. If, however, the Fourier transform is operated on out of phase sets of data, the correlation peak may be duplicated, leaving a very small value on the expected bin position and two larger side peaks.

Timing Error Estimation

Demodulation consists in eliminating the carrier frequency of a complex exponential function. If timing is perfectly aligned, then the frequency will be aligned with one FFT bin. If not, it will span over several bins. There are known algorithms for estimating the accurate frequency of a complex exponential signal by looking at the content of several FFT bins. These, however, work unsatisfactorily in the case at hand, because the signal comprises, due to the cyclical shift two exponential complex signals with different phases.

In a preferred embodiment, the receiver of the invention tracks and corrects the timing error as follows:

For each received symbol, the processor first performs a hard demodulation, in the sense that it finds the position of maximum amplitude of the FFT signal. In the frame synchronization phase, only three demodulation values are possible, while during the demodulation of the data section, all the values of the used modulation set, which can be complete or incomplete can be received. If a reduced modulation set is used, the hard-demodulated value of the cyclical shift will not necessarily match the position of the FFT maximum. This usually indicates a timing error greater than one sample or could be caused by a noisy channel.

Denoting with N the position of the maximum, we have, for a complete modulation set: $N=\arg\max_n(|X(n,k)|)$, while, the result for a partial modulation set is:

$$N = \arg\max_n(|X(\text{mod}((n-1), SF), k)| + |X(n, k)| + |X(\text{mod}((n+1), SF), k)|)$$

The receiver then evaluates the timing error as $$TE_{raw}(k) = \frac{|X(\text{mod}((N-1), SF), k)| - |X(\text{mod}((N+1), SF), k)|}{|X(N, k)|}$$

Figure 5:
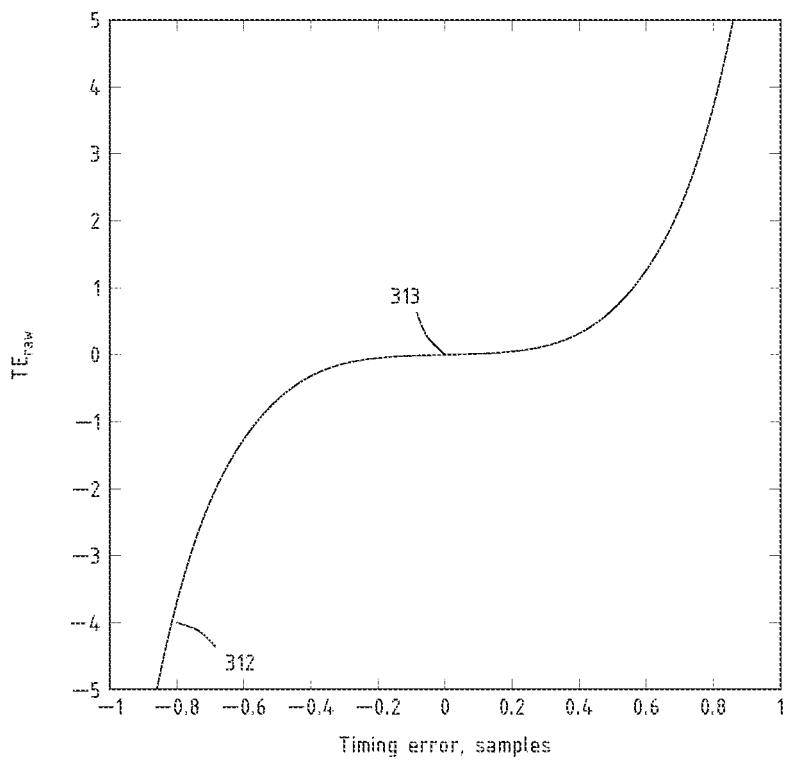
FIG. 5 is a plot of the output function of a measure of the timing error.
Figure 3:
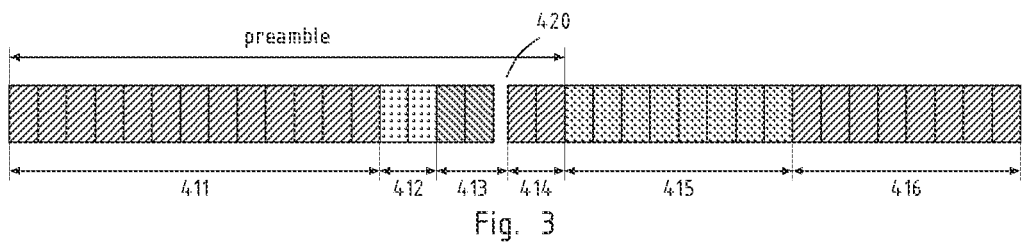
Figure 4:
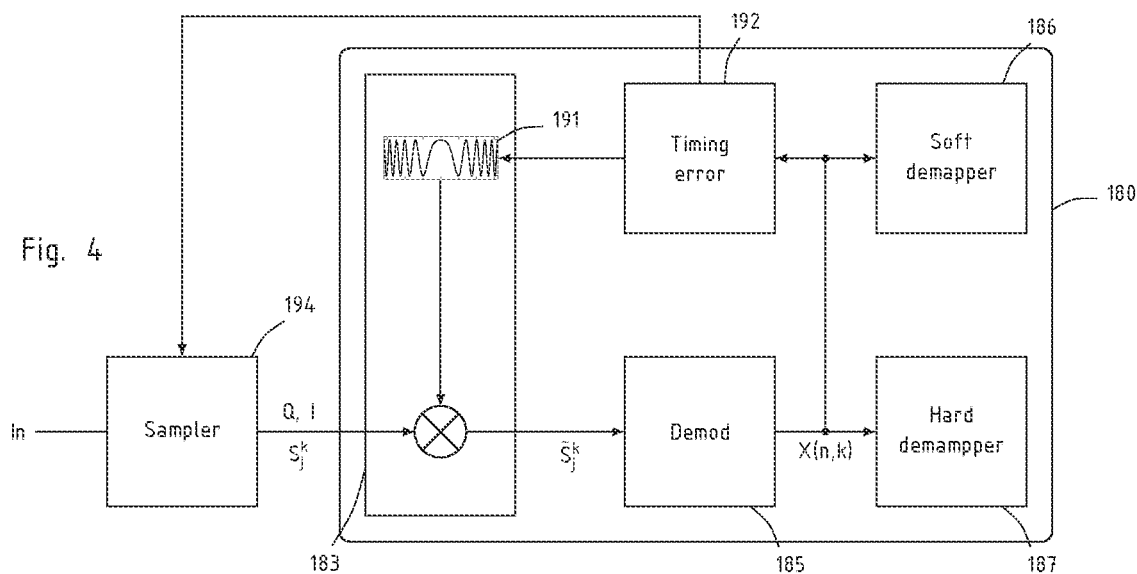
Figure 5:
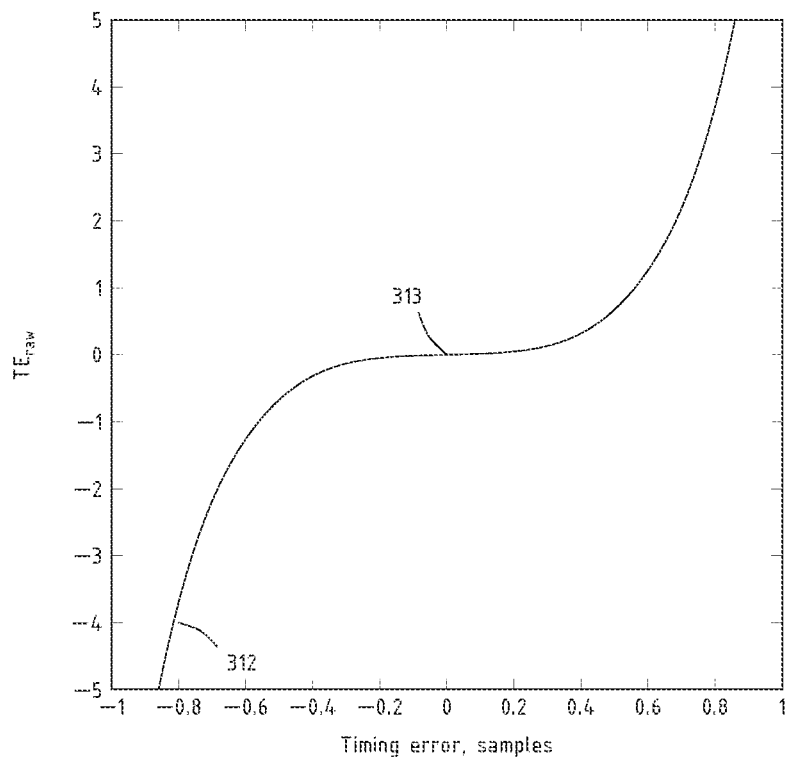

Neglecting noise, the $TE_{raw}$ is a function of the actual timing error that can be calculated or measured and is plotted in FIG. 5. The receiver is arranged for determining a hard-demodulated cyclical shift N, computing the ratio $TE_{raw}$ between the summed amplitudes of the FFT signal at two bins adjacent to the N position, and the amplitude at the N position. The actual timing error can then be obtained from $TE_{raw}$ by inverting the non-linear function of FIG. 5. The $TE_{raw}$ is defined as a function of the actual timing error in the domain ±1 sample. When using a full modulation set, the timing error is limited to ±½ sample, so the function above is enough. If a reduced modulation set is employed, the timing error can exceed one sample. In such cases, the integer part can be pre-estimated form the position of the maximum, relative to the hard-demodulated value.

It is noted that $TE_{raw}$ has a horizontal inflexion point at the origin k=0 and, when it is used to estimate the timing error, it exhibits a zero-sensitivity point in the middle of its range. Consequently, any tracking loop using this estimator will not be capable of keeping the timing error at a stable value equal or very close to zero.

Figure 6:
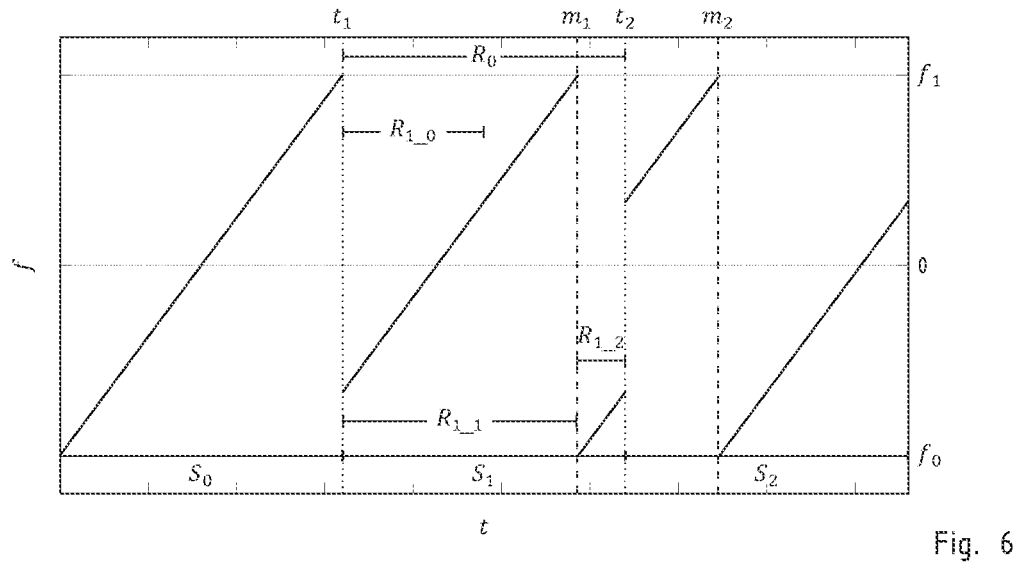
FIG. 6 exemplifies the frequency discontinuities in modulated LoRa signals.
Figure 7:
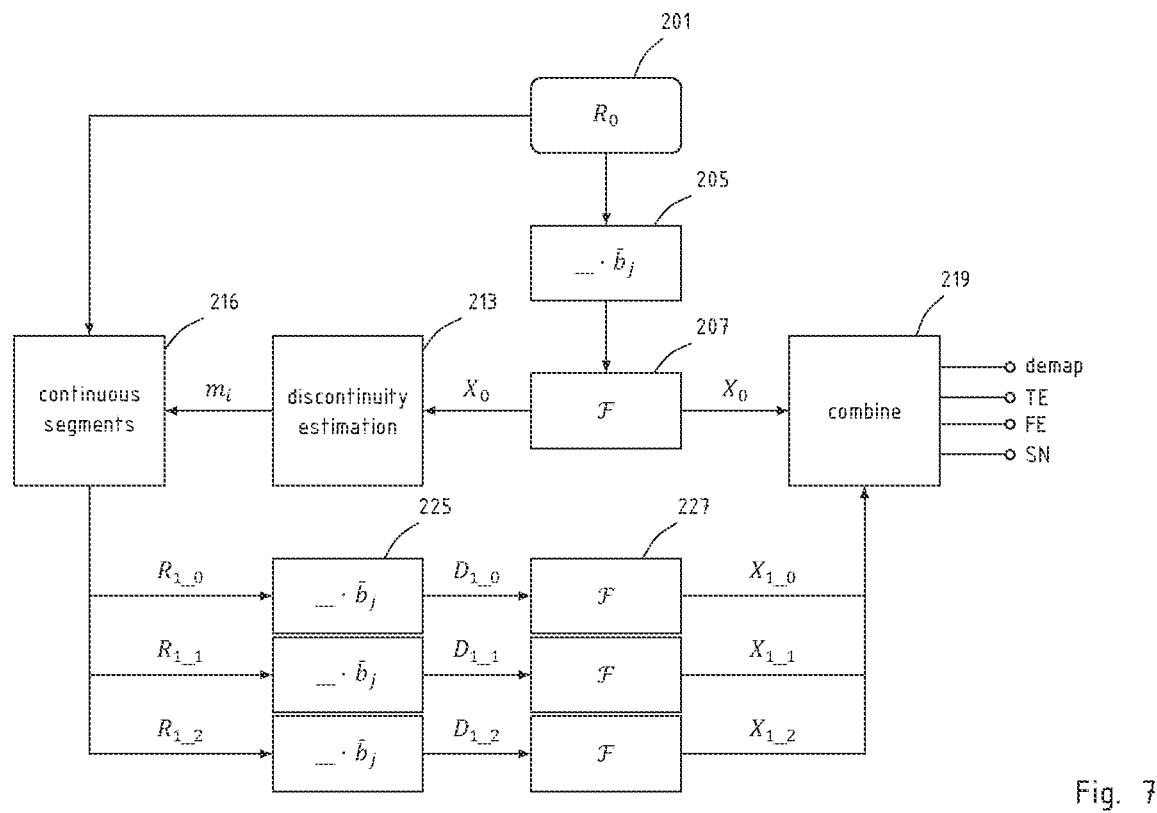
FIG. 7 illustrates a timing error evaluation process according to an aspect of the present invention.

To overcome the above loss of sensitivity, the processor of the invention, as illustrated in FIGS. 6 and 7, preferably includes a step of processing the symbols a second time after the initial demodulation, wherein the position of a frequency discontinuity within each symbol is estimated, the estimated position is used to extract continuous subsegments in each symbol, and a simplified demodulation of the continuous segments. The frequency error can be estimated based on the position of the peak in the demodulated continuous segments in various ways.

As shown in FIG. 6, plotting the instantaneous frequency of a LoRa signal as a function of time including three symbols, the frequency presents a jump at each symbol boundary (dotted vertical lines). The first symbol $S_0$ is unmodulated and shows a continuously variable frequency from the beginning to the end. The following symbols, $S_1$ and $S_2$, are modulated, and have discontinuity marked by the dashed vertical lines. Importantly, the positions of the discontinuities are determined by the cyclical shift, and therefore by the modulation value of each symbol.

Reverting to FIG. 7, the processor of the invention operates on individual received symbol, and the vector containing the series of digital values corresponding to a symbol will be denoted by $R_0$ (box 201). Block 213 estimates the position of the discontinuity in vector signal $R_0$. A convenient manner of estimating the discontinuity is by means of a "hard" LoRa demodulator as described above and including steps of dechirping 205 Fourier transform 207, whereby the position of the discontinuity will be indicated by the position of the maximum in complex signal $X_0$. Other methods of estimating the position of the discontinuity are possible and included in the scope of the present invention. The position of the discontinuity could be known in advance.

Block 216 determines, for each processed symbol, one or more frequency-contiguous fragments that exclude the frequency discontinuity. Such fragments are coherent despite the unavoidable time and frequency errors.

Several methods are available to extract the fragments: A first frequency-continuous vector $R_{1\_0}$ (visible in FIG. 6) can be constructed by observing that, from the knowledge of the position of the discontinuity, it is possible to choose a segment having length SF/2 equal to one half of the full length of a symbol. Another possibility is to split the input vector $R_0$ into one continuous vector including all the samples up to the frequency discontinuity, and one second continuous vector including all the sample after the frequency discontinuity. Such vectors are denoted as $R_{1\_1}$ and $R_{1\_2}$ in FIG. 6, where $R_{1\_1}$ is conventionally the vector having more samples. $R_{1\_1}$ and $R_{1\_2}$ have originally variable lengths, but they can be brought to constant length by padding or masking.

The continuous vectors $R_{1\_0}$, $R_{1\_1}$, $R_{1\_2}$, or other continuous vectors, as the case may be, are demodulated by dechirping operations 225 and Fourier transforms 227 producing the complex vectors $X_{1\_0}$, $X_{1\_1}$, $X_{1\_2}$. Advantageously, the Fourier transforms 227 need not be complete FFT operation, because the algorithm mainly needs to determine the position of the maximum, which is approximately known in advance from $X_0$, for example. The Fourier blocks 227 could execute simpler DFT operations that compute only the value at the expected maximum position and at a limited number of bins surrounding the expected maximum position. For example, each DFT block 227 could determine only five samples (the central one corresponding to the expected maximum position and two "guard" samples on each side).

The blocks in FIG. 7 designate processing steps that may be implemented partly or completely in software, and do not necessary correspond to physical distinct elements. The vectors $R_{1\_0}$, $R_{1\_1}$, $R_{1\_2}$, $X_{1\_0}$, $X_{1\_1}$, $X_{1\_2}$ are likewise virtual, and need not be stored in physically distinct areas of memory.

One possible estimation of the timing error TE is provided by the following "half-DFT" estimator:

$$TE(k) = \frac{|X_{1\_0}(\mathrm{mod}((N-1), SF), k)| - |X_{1\_0}(\mathrm{mod}((N+1), SF), k)|}{|X_{1\_0}(N, k)|}$$

where N is, as before, the position of the peak in the Fourier transform $X_{1\_0}$. in contrast with the $TE_{raw}$ function above, this estimator has no dead spot in the centre and is in fact a linear estimator of the timing error, with constant gain. Similar estimators can be constructed from $X_{1\_1}$ or $X_{1\_2}$ and, for most modulation values, these estimators provide a correct estimation without a dead zone as well but show nonlinear behaviour. For unmodulated symbols, for example, $X_{1\_1}$ is the same thing as $X_0$, and $X_{1\_2}$ is empty; the timing error estimated from $X_{1\_1}$ is the same as the $TE_{raw}$ disclosed above.

The constant gain estimation TE(k) defined above uses only half of the samples in a symbol and, therefore, the signal/noise ratio is worse by about 3 dB. At least for some modulation values close to SF/2, the estimations obtained from $X_{1\_1}$ and $X_{1\_2}$ have comparable sensitivities and can be added (non-coherently) to improve the processing gain and the SNR.

The timing error estimation can be used to track and correct the error in the time domain, for example using it directly as timing adjustment, including on the local generator of the conjugate chirp and on the input sampling and decimation stages.

In addition, or in alternative, the timing error estimation can be used to correct the error in the frequency domain, for example updating a frequency offset that is applied as a systematic adjustment per symbol.

Independent estimations of the frequency error and of the timing error can be obtained also using $R_{1\_1}$ and $R_{1\_2}$, provided the SNR is adequate and that these vectors have similar lengths—the shorter $R_{1\_1}$ or $R_{1\_2}$, the higher the required SNR. If the vector R0 is wrapped such that $t_1 \equiv t_2$, $R_{1\_1}$ and $R_{1\_2}$ cover the whole symbol and meet at two points: at the point $m_1$ at which the frequency jumps from positive to negative values, and at the beginning and end of the symbol $t_1 \equiv t_2$. The method is based on the measure of the phase jumps present at two phase discontinuity at these boundaries. The method is valid only to estimate fractional errors and is not capable of determining a combination of integer frequency and timing errors, such as, for example, a frequency error of 1 bin ($BW/2^{SF}$) with a timing error of one sample (−1/BW).

When neither frequency error nor timing error are present, the phase of the input vector $R_0$ has no discontinuities, and the first and last sample in a symbol have the same phase value, such that the phase of $R_0$ is continuous when the vector is wrapped. If only a timing error is present, a phase discontinuity will arise between the end of $R_{1\_1}$ and the start of $R_{1\_2}$, that is, at the point $m_1$ at which the frequency jumps from positive to negative values. A frequency error, on the other hand, will give rise to a difference of phase between the initial value of $R_0$ at point $t_1$, and the final value of $R_0$ at point $t_2$ and, equivalently, to a discontinuity at $t_1 \equiv t_2$ when $R_0$ is wrapped. The phase jump in each discontinuity is proportional to the corresponding time or frequency error.

In a possible variant, the radio receiver of the present invention is arranged to determine a timing error and/or a frequency error in its internal time reference, based on the phase discontinuities of the received signal $R_0$. These phase discontinuities can be evaluated in several ways including: considering the product between the dechirped signal and the complex conjugate of a pure tone whose frequency is equal to the hard/demodulated value for the current symbol (modulation removal in the frequency domain); multiplying the received vector by the complex conjugate of a modulated chirp signal corresponding again to the hard-modulated value; The time and frequency errors can also be obtained in the frequency domain, by considering the phases in the Fourier transforms $X_{1\_0}$, $X_{1\_1}$, $X_{1\_2}$ performed on the continuous segments $R_{1\_0}$, $R_{1\_1}$, $R_{1\_2}$ defined above.

In an example, the same time boundaries used to extract $R_{1\_1}$ and $R_{1\_2}$ are retained, which gives the corresponding partial dechirped vectors $D_{1\_1}$ and $D_{1\_2}$ after step 225 (FIG. 7). Then the receiver is arranged to compute a fit of the phases of $D_{1\_1}$ on one side, and $D_{1\_2}$ on the other side is computed. The fit can be linear of, if the SNR is enough, polynomial. The phase discontinuities at points $m_1$ and $t_1 \equiv t_2$ can be deduced from the fit results and timing and frequency errors can be computed directly from the corresponding jumps.

In the frequency domain it is possible to build another "phase jump" estimator that deduces the time and frequency errors from the phases in the Fourier transforms $X_{1\_0}$, $X_{1\_1}$, $X_{1\_2}$ performed on the continuous segments $R_{1\_0}$, $R_{1\_1}$, $R_{1\_2}$ defined above, in contrast with the "Half-DFT" function introduced above that was expressed in term of Fourier amplitudes, for example:

$$TE2(k) = \frac{\phi(X_{1\_2}(N, k)) - \phi(X_{1\_1}(N, k))}{2\pi}$$

where N is, as above, the position of the maximum in the Fourier transform $X_{1\_0}$.

Figure 8A:
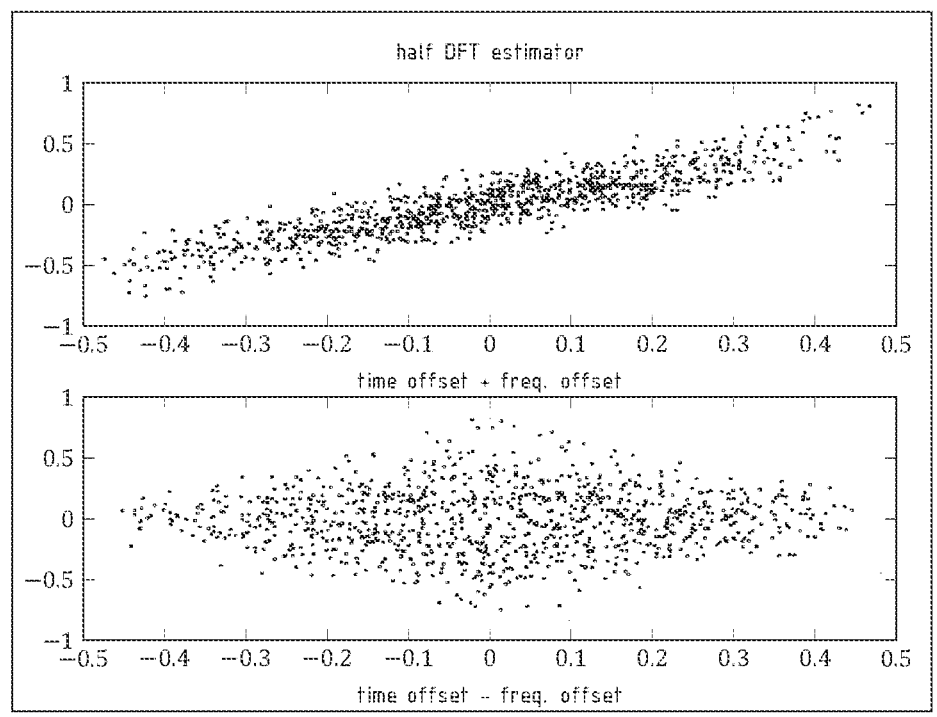
FIGS. 8a and 8b plot the output of two error estimator algorithms used in the invention with a SNR close to the limit sensitivity. The former, designated in this specification as "Half-DFT" considers the amplitudes of Fourier transforms of dechirped coherent segments of signal in the neighborhood of a modulation peak while the latter, designated as "phase jump" estimator, is based on the complex argument of the values in the same Fourier transforms.
Figure 8B:
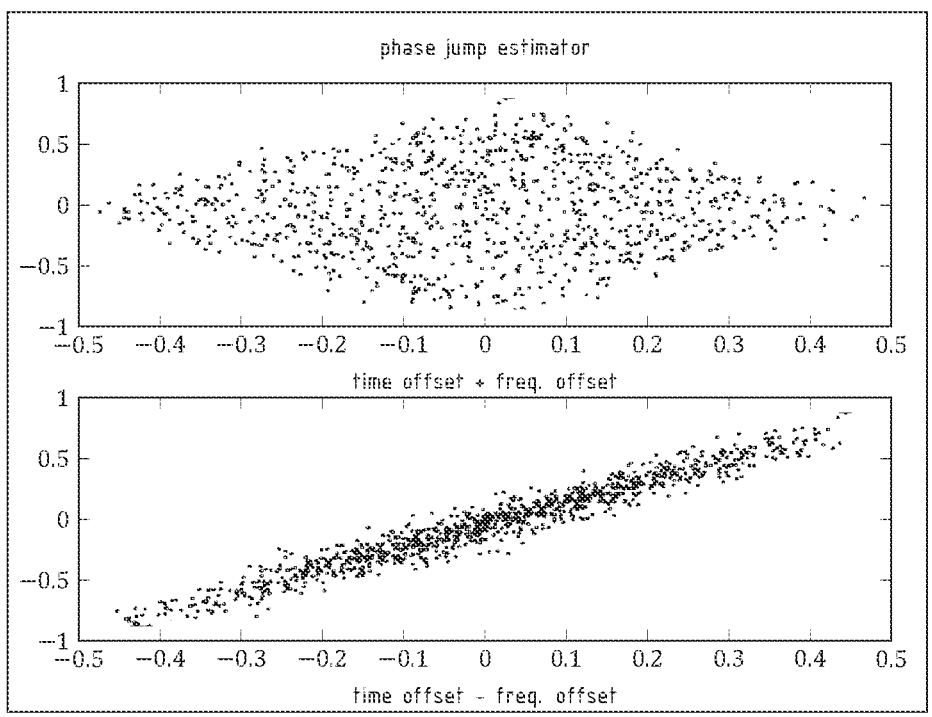

FIGS. 8a and 8b plot the performance of the "Half-DFT" estimator and of the "phase jump" one, in simulated situations in which the SNR is close to the limit sensitivity. In each figure, the estimator output is plotted against the sum and the difference of the offsets in time and frequency.

The inventors have found that the first estimator is a faithful indicator of the sum of the frequency error and of the timing error, as demonstrated by plot 8a, while the second is sensitive to the difference between these two components of the error. It results that, by considering the amplitudes and the phases of the Fourier transforms $X_{1\_0}$, $X_{1\_1}$, $X_{1\_2}$ performed on the continuous segments $R_{1\_0}$, $R_{1\_1}$, $R_{1\_2}$, these estimators provide complementary results and can yield, when considered together, an estimation of both the frequency and the timing error.

The strategy of error correction, in the time domain or in the frequency domain, can be chosen dynamically based on the SNR and/or on the time elapsed since the beginning of the frame.

Preferably, the timing and frequency estimation errors are preliminarily processed by a digital filter, for example Proportional/Integral filter to track the timing and frequency errors. The coefficients of the digital filter preferably are adapted dynamically to several variables, such as:

Symbol position in the frame: in preamble the modulation value is known beforehand, and preamble and header conventionally use a reduced modulation alphabet, increasing the confidence in the estimator's output.

SNR margin: the gain can be increased without degrading the tracking performances as a higher SNR allows tracking faster drifts.

Drift estimation: when the drift is absent or negligible, the integral coefficient can be reduced or nulled, which improves performances close to sensitivity levels. When the drift value is high, conversely, a higher value of the integral coefficient may advantageously be applied.

Figure 9:
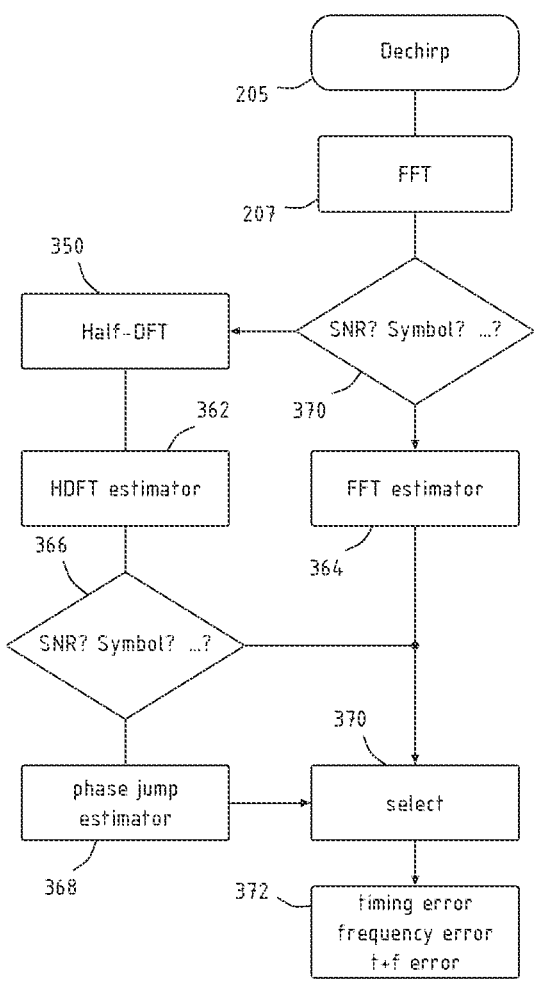
FIG. 9 represents a method combining diverse error estimators.

FIG. 9 shows, in a flowchart, a possible estimation of the timing error in consideration of several variables. In step 370, the algorithm choses an estimation strategy based on the symbol position in the frame, the SNR ratio, and possibly other inputs, like recorded preferences. The FFT estimator computed in step 364 may be the $TE_{raw}$ estimator introduced above and, if appropriate, the Half-DFT estimator is computed in steps 350 and 362. In step 366, the algorithm adaptively decides whether computing the phase-jump estimator and, if appropriate, this is done in step 368. Step 370 combines these results and produces the desired timing and frequency error, or the combined time+frequency error.

The vectors $X_{1\_0}$, $X_{1\_1}$, $X_{1\_2}$ derived from the dechirping and Fourier-transforming the continuous segments $R_{1\_0}$, $R_{1\_1}$, $R_{1\_2}$, which are coherent fragments of the signal, can be used to compute a hard or soft demodulation value, or a SNR. As for the timing error estimation, the values obtained from the coherent fragments are generally more reliable than those obtainable from the full vector R0. The receiver may be arranged to switch dynamically between these vectors based on SNR and/or modulation value and/or other variables.

The timing error tracking loop can be used in a receiver to derive an accurate timestamping. To this purpose the receiver averages the output of the timing error estimator, for example over the entire data symbols, and samples a counter at a specific and predetermined time at a fixed position in a frame. The combination of these two elements of information yields a fine timestamp of the received frame.

The timestamps derived as described above can be used to synchronize gateways from a server, by requesting each gateways, after setting a reference time base and aligning at least one gateway with this time frame, by causing all the gateways to transmit regularly at predetermined times each in its own time base, receiving and timestamping these regular transmission in the gateways to derive time base compensations.

Since the propagation time between gateways is unknown, but constant, and identical in both directions, each message transmitted between two gateways and timestamped can be translated in an equation where the unknown are the propagation times, the frequencies of the local counters, and the time offset of the local time bases. When the number of communicated gateways is sufficient, the system is determined or over-determined, and can be solved to determine the above unknown.

Preferably, some gateway will be equipped with an externally disciplined precision time reference, for example a GNSS clock, to include an absolute time determination in the system. The synchronization method defined above may be an element of a distributed (cloud) synchronization service with the absolute-time precision of the GNSS clocks.

The invention claimed is:

1. Radio receiver device comprising: a signal processor configured to process digital chirp spread-spectrum modulated signals that comprise a plurality of symbols constituted by frequency chirps that are cyclically time-shifted replicas of a base chirp profile, said time-shifts being an encoded representation of a transmitted message, wherein the signal processor is further configured to estimate a position of a frequency discontinuity in each symbol, extract one or more frequency-continuous fragments out of each symbol, dechirp the frequency-continuous fragments, determine a timing error, and/or a modulation value, and/or a SNR.

2. The radio receiver device of claim 1, wherein the signal processor is further configured to choose dynamically one of the frequency-continuous fragments or the entire symbol for the determination of the timing error, and/or modulation value, and/or SNR, based on a detected SNR or modulation value.

3. The radio receiver device of claim 1, the signal processor being further configured to select two coherent fragments covering a symbol, determine a timing error and/or a frequency error from the phase jumps present at two phase discontinuity at the boundaries between the selected coherent fragments.

4. The radio receiver device of claim 1, the signal processor being further configured to compute Fourier transforms of the frequency-continuous fragments and to compute a timing error and/or a frequency error from the amplitudes and/or the phases of the Fourier transforms in the neighbourhood of modulation peaks.

5. The radio receiver device of claim 1, the signal processor being further configured to determine a timing error and feeding the timing error to a Proportional/Integral tracking loop.

6. The radio receiver device of claim 5, wherein coefficient of the Proportional/Integral tracking loop are dynamically adapted.

7. The radio receiver device of claim 1, the signal processor being further configured to determine a timing error and compensate the timing error in the time domain and/or in the frequency domain.

8. The radio receiver device of claim 1, the signal processor being further configured to determine a timing error and timestamp a received frame by combining an average of the timing error and a value of a counter sampled at a predetermined position in the received frame.

9. A system comprising a plurality of gateways having each a receiver according to claim 1, the gateways being arranged to synchronise their time references by emitting regular transmission and listening to regular transmission from the other gateways, timestamp the received regular transmission.

* * * * *